(12) United States Patent
Herron et al.

(10) Patent No.: US 10,718,453 B2
(45) Date of Patent: Jul. 21, 2020

(54) FLEXIBLE HOSE WITH IMPROVED OVER-MOLDED CUFFS AND METHODS OF MAKING SAME

(71) Applicant: Flexible Technologies, Inc., Abbeville, SC (US)

(72) Inventors: Roy Herron, Starr, SC (US); Meredith Kaye Torgerson, Greenwood, SC (US); James Smouse, Belton, SC (US)

(73) Assignee: FLEXIBLE TECHNOLOGIES, INC., Abbeville, SC (US)

( * ) Notice: Subject to any disclaimer, the term of this patent is extended or adjusted under 35 U.S.C. 154(b) by 336 days.

(21) Appl. No.: 15/896,371

(22) Filed: Feb. 14, 2018

(65) Prior Publication Data
US 2019/0154178 A1    May 23, 2019

Related U.S. Application Data

(60) Provisional application No. 62/497,309, filed on Nov. 21, 2017.

(51) Int. Cl.
| | |
|---|---|
| *F16L 33/34* | (2006.01) |
| *F16L 33/207* | (2006.01) |
| *F16L 11/08* | (2006.01) |
| *F16L 33/32* | (2006.01) |

(52) U.S. Cl.
CPC ......... *F16L 33/2076* (2013.01); *F16L 11/081* (2013.01); *F16L 33/32* (2013.01); *F16L 33/34* (2013.01)

(58) Field of Classification Search
CPC ....... F16L 33/34; F16L 33/2076; F16L 11/081
USPC .......................................................... 285/903
See application file for complete search history.

(56) References Cited

U.S. PATENT DOCUMENTS

| | | | |
|---|---|---|---|
| 2,323,912 A | 7/1943 | Johnson | |
| 3,008,738 A | 11/1961 | Longfellow | |
| 3,140,106 A | 7/1964 | Thomas | |
| 3,488,073 A * | 1/1970 | Wold ...................... | F16L 11/15 |
| | | | 285/388 |
| 3,596,933 A | 8/1971 | Luckenbill | |

(Continued)

FOREIGN PATENT DOCUMENTS

| | | |
|---|---|---|
| CN | 103476454 | 12/2013 |
| DE | 3133837 | 3/1983 |

(Continued)

*Primary Examiner* — David Bochna
(74) *Attorney, Agent, or Firm* — Clark & Brody LP

(57) ABSTRACT

A hose assembly is formed with a flexible helical hose body, a termination ring secured to an end, and over-molded plastic. The termination ring includes a main ring, a secondary ring, and connector members, each configured to span between and be integrally connected with the main and secondary rings. The main ring has an inside surface formed to threadably couple to a corresponding helical portion of the hose body, and be positioned at least two to three turns away from the hose end. The length of the connector members positions the secondary ring at least two turns closer to the hose end. Each connector member has outwardly protruding ridges. Plastic is over-molded to encapsulate the first end of the hose body, to encapsulate the secondary ring and each connector member, and to encapsulate a portion of the main ring, while extending beyond the hose end to form a soft cuff.

10 Claims, 11 Drawing Sheets

(56) References Cited

U.S. PATENT DOCUMENTS

| | | | |
|---|---|---|---|
| 4,345,805 A | 8/1982 | Finley | |
| 4,564,222 A | 1/1986 | Loker | |
| 4,630,850 A * | 12/1986 | Saka | F16L 25/0036 |
| | | | 285/322 |
| 4,705,304 A | 11/1987 | Matsuda | |
| 4,752,208 A * | 6/1988 | Iwata | B29C 45/14598 |
| | | | 264/266 |
| 5,096,231 A | 3/1992 | Chisnell | |
| 5,131,687 A | 7/1992 | Marchou | |
| 5,529,743 A * | 6/1996 | Powell | B29C 45/14598 |
| | | | 264/274 |
| 5,733,145 A | 3/1998 | Wood | |
| 6,041,824 A * | 3/2000 | Powell | B29C 45/14598 |
| | | | 138/109 |
| 6,237,969 B1 * | 5/2001 | Amatsutsu | F16L 25/0036 |
| | | | 285/357 |
| 6,435,567 B2 * | 8/2002 | Kikumori | F16L 25/0036 |
| | | | 285/319 |
| 6,581,984 B1 * | 6/2003 | Seung-Kyu | F16L 25/0036 |
| | | | 285/368 |
| 6,971,414 B2 * | 12/2005 | Vohrer | E03C 1/021 |
| | | | 138/109 |
| 7,108,294 B1 * | 9/2006 | Miller | F16L 25/0036 |
| | | | 285/286.1 |
| 7,150,478 B2 | 12/2006 | Poirier | |
| 8,197,546 B2 * | 6/2012 | Doubler | A61F 2/44 |
| | | | 606/279 |
| 9,009,927 B2 * | 4/2015 | Rigollet | F16L 33/03 |
| | | | 24/270 |
| 9,272,114 B2 | 3/2016 | Herron | |
| 10,281,071 B2 * | 5/2019 | Strunk | F16L 11/11 |
| 2003/0062722 A1 * | 4/2003 | Linhart | F16L 37/0985 |
| | | | 285/319 |
| 2004/0155463 A1 * | 8/2004 | Moner | F16L 25/0036 |
| | | | 285/322 |
| 2005/0023832 A1 * | 2/2005 | Edler | F16L 25/0036 |
| | | | 285/354 |
| 2006/0006651 A1 * | 1/2006 | Watanabe | F16L 25/0036 |
| | | | 285/247 |
| 2011/0133447 A1 | 6/2011 | Robbin | |

FOREIGN PATENT DOCUMENTS

| | | | |
|---|---|---|---|
| DE | 19640742 | 4/1998 | |
| EP | 2514478 A1 * | 10/2012 | F16L 33/34 |
| GB | 2 065 823 | 7/1981 | |

* cited by examiner

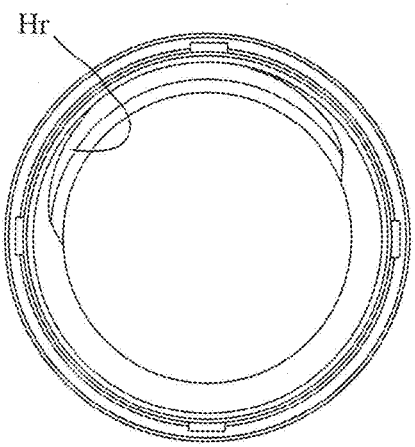
FIG. 4
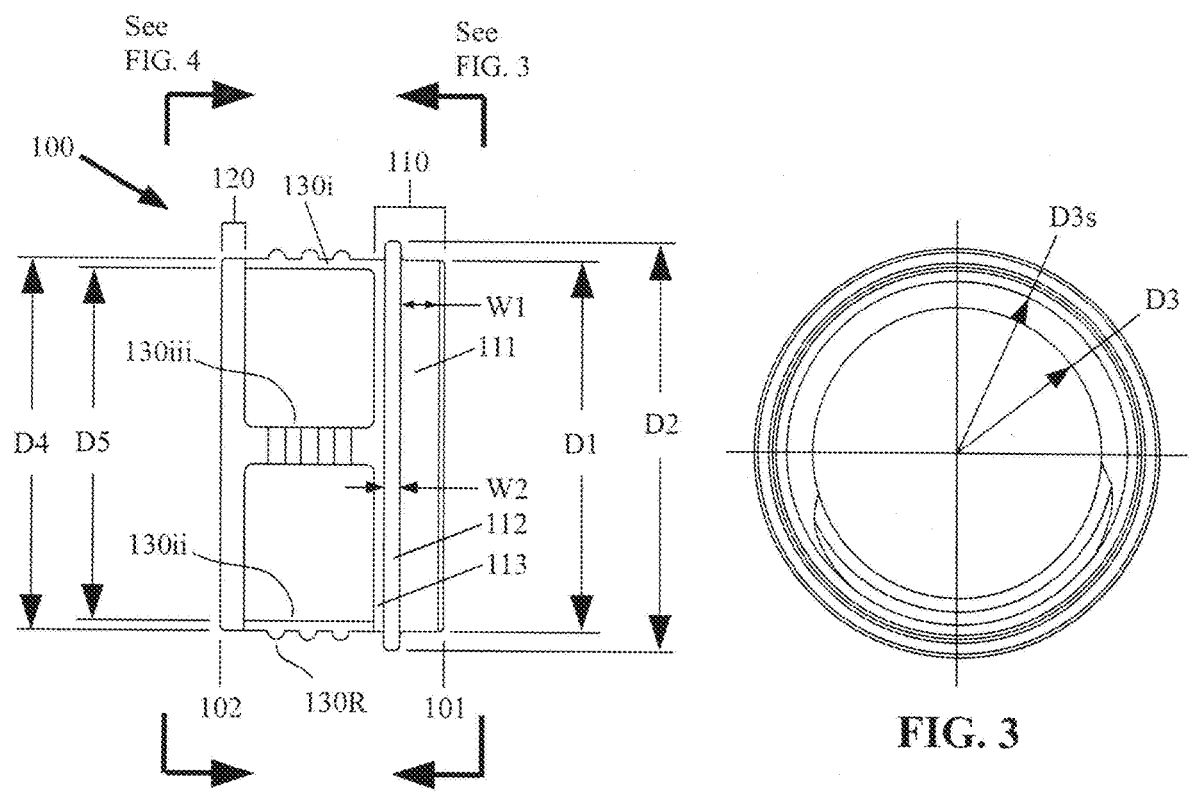
FIG. 2
FIG. 3

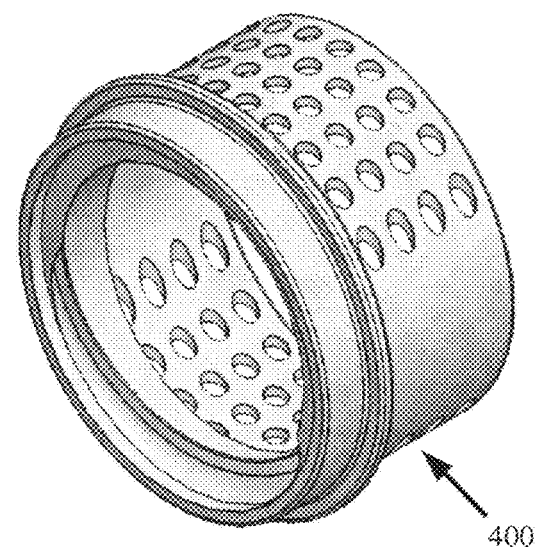
FIG. 12
FIG. 15
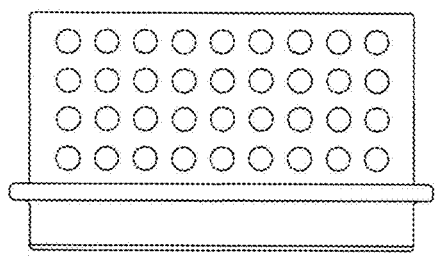
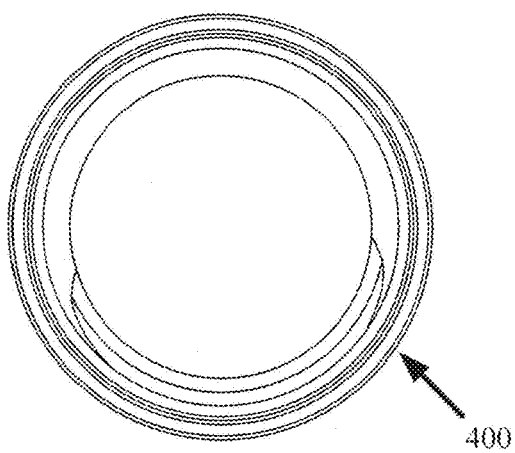
FIG. 13
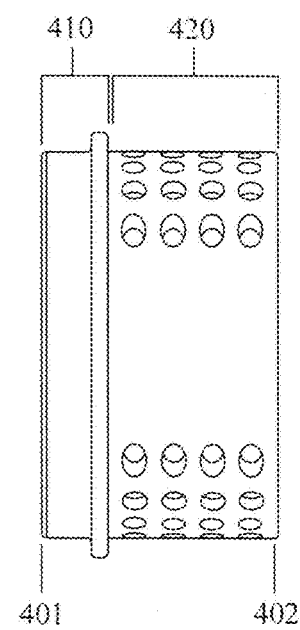
FIG. 14

FLEXIBLE HOSE WITH IMPROVED OVER-MOLDED CUFFS AND METHODS OF MAKING SAME

CROSS REFERENCES TO RELATED APPLICATIONS

This application claims priority on U.S. Provisional Application Ser. No. 62/497,309, filed on Nov. 21, 2017, the disclosures of which are incorporated herein by

FIELD OF THE INVENTION

The present invention relates to improvements in flexible hoses, and more particularly to improvements in hoses that have ends that terminate in an over-molded cuff.

BACKGROUND OF THE INVENTION

There are many applications in which a hose is used to transport material—gases, liquids, etc., and the hose needs to be configured for one or both of its ends to quickly and easily be inserted into a receptacle. An example of which is the hose that is used to connect a breathing mask to a continuous positive airway pressure (CPAP) machine used by people who suffer from sleep apnea. The hose used with a CPAP machine may have a soft plastic "cuff" at the end(s), which may provide a more positive connection to the machine and/or to the mask.

The soft plastic cuff may be formed by over-molding plastic over the end of the hose body. However, this approach has problems, particularly that the molding process must shut off on the helical hose, and often tends to pinch the flexible hose, creating quality and functional defects thereat.

The over-molded cuff arrangement and method disclosed herein solves these problems for the molding of plastic cuffs for hoses that use such end cuffs, including, but not limited to, the above-noted example of the CPAP hose.

OBJECTS OF THE INVENTION

It is an object of the invention to provide a flexible hose that may have one or both of its ends configured to quickly and easily be inserted into a receptacle, by being formed with an over-molded soft plastic cuff.

It is another object of the invention to provide an improved over-molded plastic end cuff configuration for a flexible hose, and an improved method of manufacturing the same.

It is a further object of the invention to improve the over-molding of a plastic end cuff for a helical hose, through the use of a frame structure secured to the end of the hose helix, upon which the plastic may be over-molded.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A flexible hose body may be formed to include a reinforcement member formed into a series of flexible turns, which turns may be helical, having a first end and a second end, with each of the turns spaced from an adjacent one of the turns to create an interstitial area. One or more layers of a flexible material may be formed to overlay at least a portion of the series of turns of the reinforcement member and the corresponding interstitial areas, to create an opening at each of the first and second ends of the hose body. Each of the ends of the hose body may have a fitting that may include a special shaped/sized termination ring that is particularly applied onto the end of the hose body, prior to the end being over-molded with plastic.

The termination ring may include a main ring member, a secondary ring member, and a plurality of connector members. The main ring member may have an inside surface formed with at least a portion of an internal thread to be threadably coupled to a corresponding portion of the series of turns of the reinforcement member, at an end. In one embodiment, the main ring may be coupled to the series of turns to at least be positioned two to three turns away from the end of the hose body. The plurality of connector members may each be integrally connected to, and span between, the main ring member and the secondary ring member, and may be equally distributed about the axis of the hose body. Both the secondary ring member and the connector members may have in interior surface that may be positioned radially outward from the axis of the hose body to be proximate to the layers of flexible reinforcement material overlaying the reinforcement member. Also, each of the plurality of connector members may be formed to have a particular length that is configured to position the secondary ring member to be roughly two turns of the reinforcement member away from the main ring member. Also, each of the connector members may have a plurality of outwardly protruding ridges. This particular configuration for the termination ring, and the arrangement with it being mechanically locked to at least a portion of one of the turns of the hose body using the internal threading or thread portion on its inner surface, provides for enhanced engagement with the over-molded plastic used for the cuff. It also provides a solid surface—being a portion of the main ring member of the termination ring—upon which the molded cuff may be terminated, thereby eliminating quality and functional defects.

The secondary ring member and the connector members serve to stabilize to the main ring member during the over-molding process, and the configuration of the secondary ring, member and the connector members enable forming of an over-molded integral cuff that has greater structural integrity, as the over-molded plastic may be molded to encapsulate the one or more layers of a flexible material of the hose body; to encapsulate the secondary ring; to encapsulate each of the plurality of connector members, and to encapsulate a portion of the main ring. To provide for better termination of the cuff at the main ring, the main ring may be formed of a first annular outer surface, a second annular outer surface, and a radially oriented shoulder surface configured to provide a step up from the first annular outer surface to the second annular outer surface. The over-molded plastic being molded to encapsulate a portion of the main ring may therefore entail the plastic being molded over the second annular surface and only a portion of its first annular surface.

BRIEF DESCRIPTION OF THE DRAWINGS

The description of the various example embodiments is explained in conjunction with appended drawings, in which:

FIG. 2 is a side view of the termination ring of FIG. 1;

FIG. 3 is a front view of the termination ring of FIG. 1;

FIG. 4 is a rear view of the termination ring of FIG. 1;

FIG. 12 illustrates a perspective view of yet another alternate embodiment of the termination ring of FIG. 1;

FIG. 13 is a front view of the termination ring shown in FIG. 12;

FIG. 14 is a side view of the termination ring shown in FIG. 12; and

FIG. 15 is a top view of the termination ring shown in FIG. 12.

DETAILED DESCRIPTION OF THE INVENTION

Figure 1A:
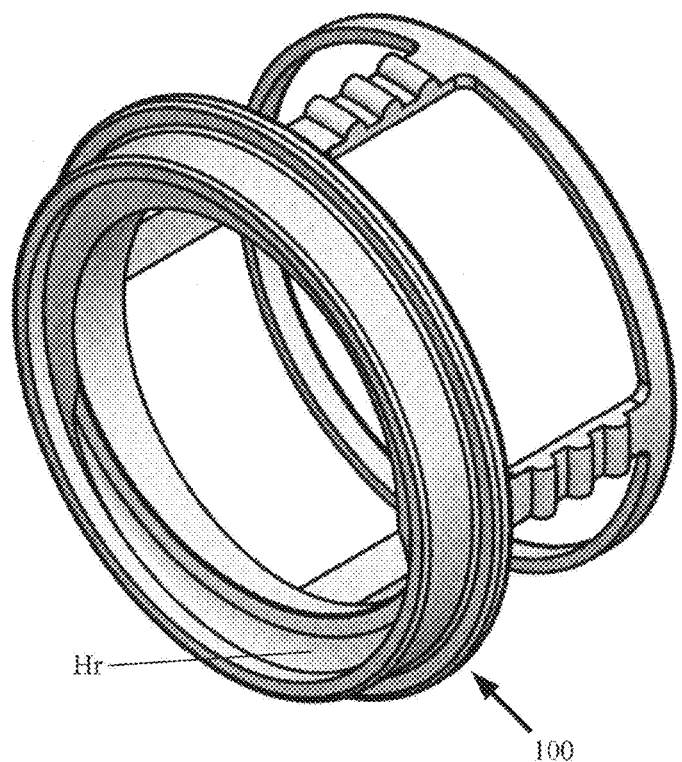
FIG. 1A is a front perspective view illustrating a first embodiment of a termination ring that may be secured to the end of a helical hose body, to be over-molded with plastic to form an improved-quality integral cuff.
Figure 1B:
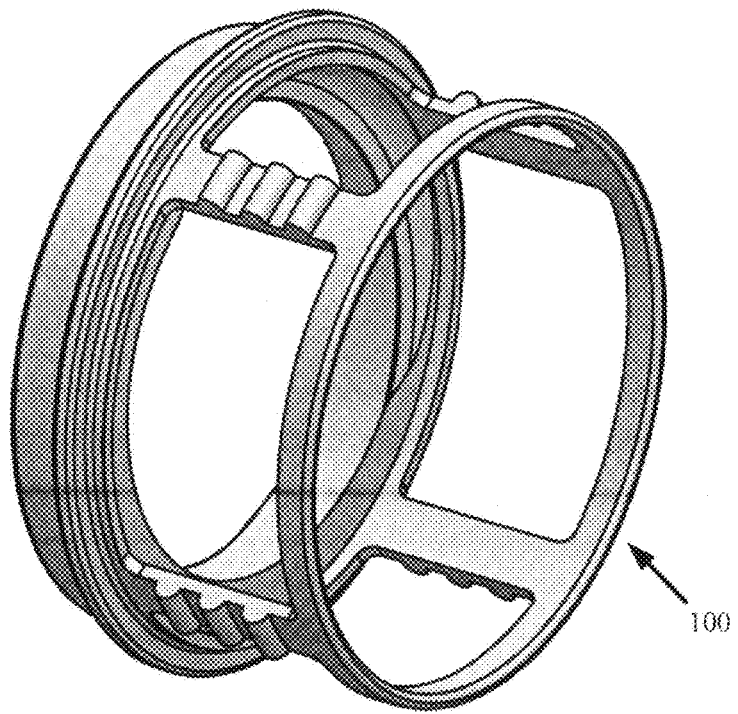
FIG. 1B is a rear perspective view of the termination ring of FIG. 1.

As used throughout this specification, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "one or more of A, B, and C", and "A, B, and/or C" mean all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference.

Furthermore, the described features, advantages, and characteristics of any particular embodiment disclosed herein, may be combined in any suitable manner with any of the other embodiments disclosed herein.

A flexible hose body 70 (see FIG. 5A) may be formed to include a reinforcement member 73 that may be formed into a series of flexible turns having a pitch P, which turns may be helical, having a first end 71 and a second end 72, with each of the turns being spaced from an adjacent one of the turns to create an interstitial area N. The reinforcement member 73 may be formed of a wire having a circular cross-sectional shape, or other flexible cross-sectional shapes may be used. One or more layers of a flexible material 74 may be applied to at least overlay at least a portion of the series of turns of the reinforcement member and the corresponding interstitial areas, and may create an opening at each of the first and second ends of the hose body 70. The flexible hose body 70 may have an outer diameter ODi at the covered reinforcement member, and a smaller, outer diameter ODii at each of the covered interstitial areas N.

Figure 7:
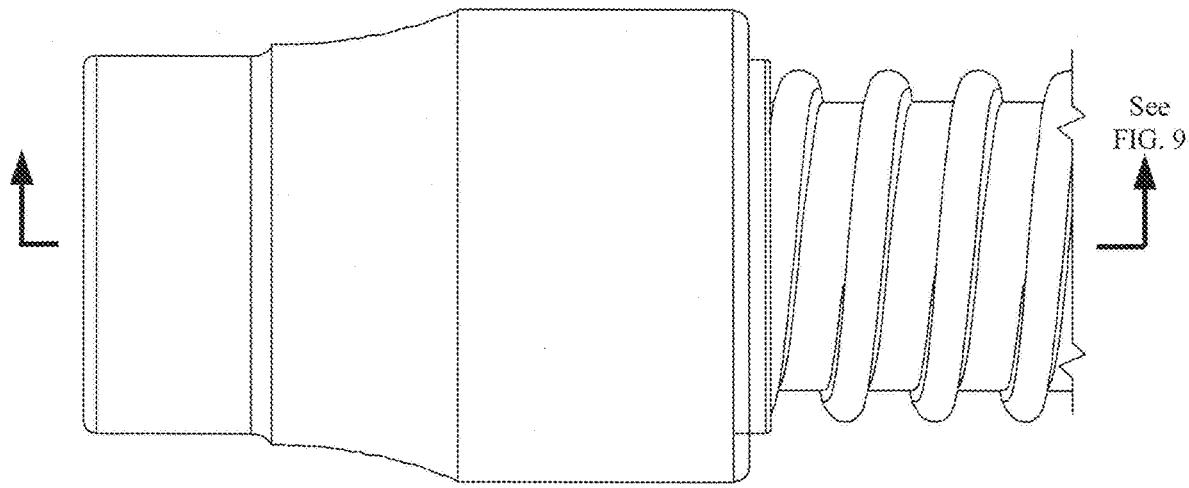
FIG. 7 is a side view of the coupled termination ring and flexible hose body shown in FIG. 5B, after being over-molded with plastic to form an improved-quality cuff.

Each of the ends of the hose body 70 may have an end fitting that may be formed with the inclusion of a specifically shaped/sized termination ring 100. The termination ring 100 may be particularly applied onto the hose body 70 (see FIGS. 5A-5B), prior to being over-molded with plastic 150 (see FIGS. 7-8).

The termination ring 100 is shown in detail within FIGS. 1-4, and as seen in FIG. 2, it may extend from a first end 101 to a second 102. The termination ring 100 may include a main ring member 110 at the first end 101, a secondary ring member 120 at the second end 102, and a plurality of connector members 130 that may span between, and may be integrally connected with, both the main ring member and the secondary ring member.

The main ring member 110 may have a first annular portion 111 with an outer diameter D1. The first annular portion may transition into a second annular portion 112, having a second outer diameter D2, that may be larger than D1, and the second annular portion 112 may transition into a third annular portion 113, which may be formed similar to the secondary ring member 120. The secondary ring member 120 may have an outer diameter D4 preferably being less than the diameter D2 of the second annular portion 112 of the main ring member 110, and the outer diameter D4 may be the same as the diameter D1 of the first annular portion 111; The secondary ring member 120 may have an inner diameter D5.

The main ring member 110 may have an inner dimeter D3, which may be stepped (i.e., stepped to diameter D3s). The main ring member 110 may be formed with a shaped recess Hr, which recess may be a helical recess that may be formed to be at least a portion of an internal thread, to be configured to be mechanically coupled/secured to a corresponding portion of the series of turns of the overlaid reinforcement member. The threaded engagement therebetween may be only a portion of one turn, or one full turn, or more than one full turn (e.g., one and a half turns, or a plurality of turns). The engagement therebetween may seal the main ring member 110 to the hose body 70, to be sealed with respect to the flow therebetween of the over-molded plastic 150. As may be seen in FIG. 2, the width W1 of the first annular portion 111 may be 2½ times larger than the width W2 of the second annular portion 112, which is discussed further hereinafter with respect to the hose body to which the termination ring 100 is to be coupled/secured.

At least two connector members 130 may preferably be used to connect the main ring member 110 to the secondary ring member 120, and which two connector members may preferably be clocked to be on opposite sides of the ring members (i.e., being clocked at zero degrees and 180 degrees—see e.g., connector members 130*i* and 130*ii* in FIG. 2). The width of each connector member may generally be very small, and as shown in FIG. 2, that width may be roughly 1/32 of the circumference formed by the diameter D4. In one embodiment the width of each connector member may be roughly between 1/28$^{th}$ and 1/36$^{th}$ of the circumference formed by the diameter D4.

Also, in one embodiment the outer surface and the inner surface of the connector members 130 may generally be flat. Alternatively, the outer surface of the connector members 130 may be annular to match the outer diameter D4 of the secondary ring member 120, and the inner surface of the connector members may be annular to match the inner diameter D5 of the secondary ring member.

Figure 8:
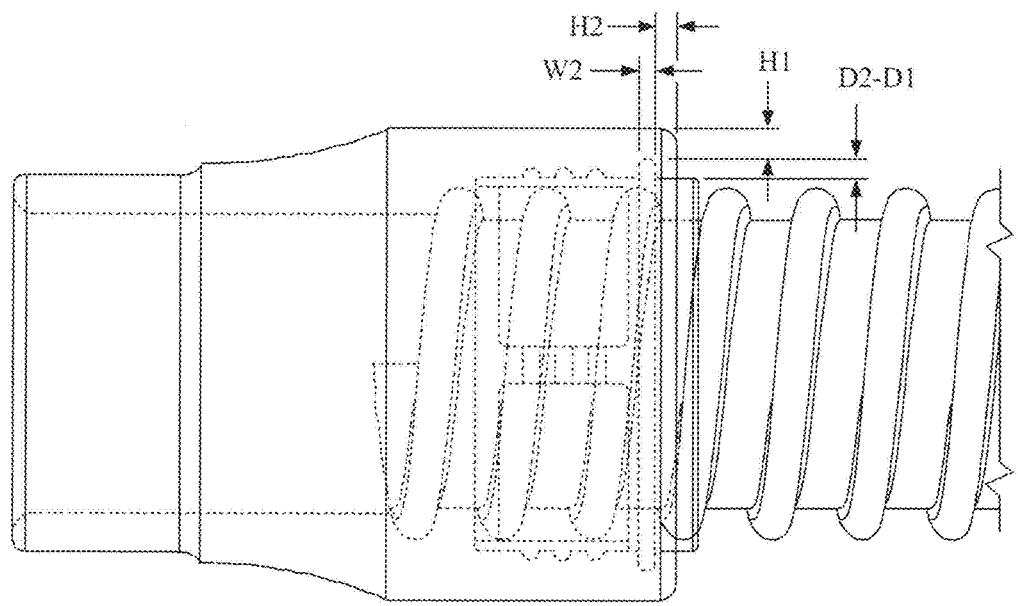
FIG. 8 is a transparent side view of the over-molded termination ring and flexible hose body shown in FIG. 7.
Figure 9:
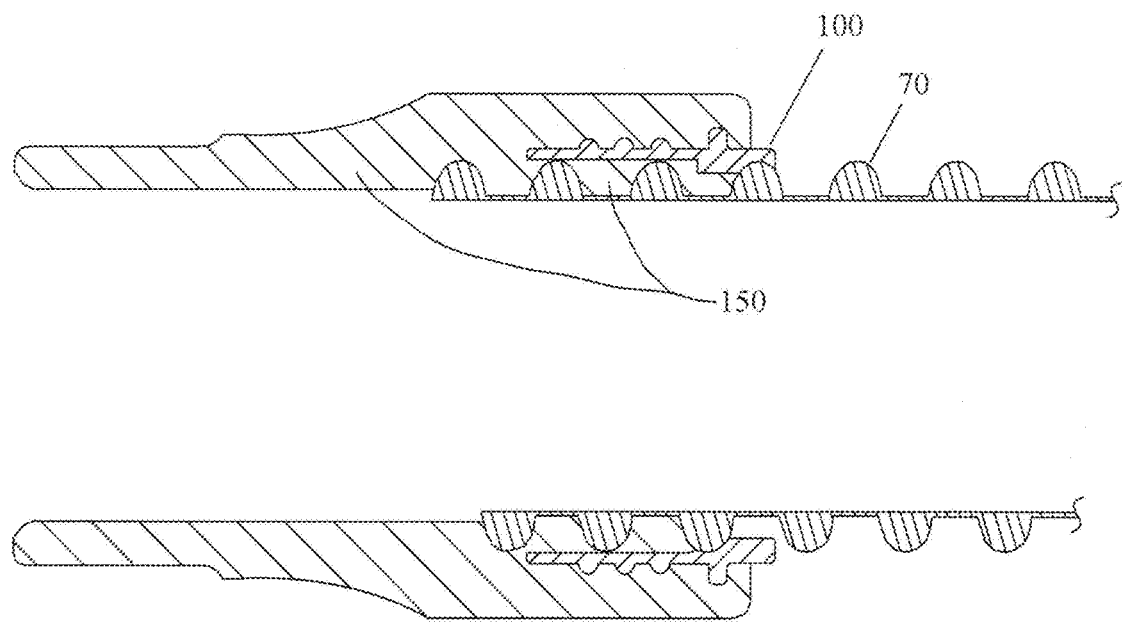
FIG. 9 is a cross-sectional view through the over-molded cuff shown in FIG. 7.

The secondary ring member 120 and the connector members 130 enhance stability and adhesion of the main ring member 110 with .respect to the hose body, and particularly with respect to the over-molded plastic 150. The over-molded plastic 150 may be injection molded to surround and encapsulate the portion of the framework formed by the secondary ring member 120 and the connector members 130, and may be interspersed within that framework to contact the outer surface of the hose body (see FIG. 9). The over-molded plastic may also be injection molded to surround and partially encapsulate a portion of the main ring 110. To provide for better termination of the injection molding of the cuff, and to provide for greater structural integrity, the molded .plastic may also be injection molded to surround and encapsulate the second annular portion 112 with outer diameter D2, of the main ring member 110, and may terminate on the annular outer surface of the first annular portion 111 with outer diameter D1, as seen in FIG. 8. The enhanced structural integrity from the encapsulation of the second annular portion 112 is in part provided by the outer diameter D2 being slightly larger than the diameter D1 of the first annular portion 111. The over-molded plastic 150 being molded to terminate on the continuous annular surface of the first annular portion 111 is more advantageous than simply over-molding the plastic directly upon the helical hose body 70, with its compound curved surfacing.

In one embodiment, as seen in FIG. 8, the over-molded plastic 150 may be formed into a cylinder to be concentric with the main and secondary rings, of the termination ring 100, and may be formed to have a diametrical extent such that it may extend a distance H1 beyond the outer diameter D2 of the second annular portion 112, where H1 may preferably be between 1.25 to 1.50 times the distance that the second annular portion 112 protrudes beyond the first annular portion 111 (i.e., H1 is preferably between 1.25(D2−D1)/2 and 1.5(D2−D1)/2). In another embodiment, depending upon the type of plastic being over-molded, the material used for the termination ring 100, etc., H1 may preferably be between 1.50 to 1.75 times the distance that the second annular portion 112 protrudes beyond the. first annular portion 111. In yet another embodiment, depending upon the type of plastic being over-molded and other factors, H1 may preferably be between 1.75 to 2.50 times the distance that the second annular portion 112 protrudes beyond the first annular portion 111.

Also, in one embodiment, the over-molding may result in the end of the plastic cuff terminating at a distance H2 beyond the end of the second annular portion 112, and H2 may preferably be between 1.0 to 1.5 times greater than the width W2 of the second annular portion 112. In another embodiment, depending upon the type of plastic being over-molded and other factors, the over-molding may preferably result in the end of the plastic cuff terminating at a distance H2 that may preferably be between 1.50 to 1.75 times greater than the width W2 of the second annular portion 112. In yet another embodiment, depending upon the type of plastic being over-molded and other factors, the over-molding may result in the end of the plastic cuff terminating at the distance 112 that may preferably be between 1.75 to 2.50 times greater than the width W2 of the second annular portion 112. The preferred ranges for either or both of the parameters H1 and H2 may relate to preventing tear-out, and to providing engagement between, and stability with respect to, the over molded plastic 150 and the termination ring 100.

Lastly, the combined widths W1 and W2 of the first and second annular portions 111 and 112 of the main ring member 100 may be large enough to provide for the desired amount of threaded engagement with the series of turns of the overlaid reinforcement member. In one embodiment, the width W1 of the first annular portion 111 of the main ring member 100 may be 1.0 to 2.0 times the extent of H2. In another embodiment, the width W1 of the first annular portion 111 of the main ring member 100 may be at least 1.75 to 2.50 times the extent of H2.

To further enhance stability, more than two connector members 130 may preferably be used. In one embodiment, three connector members 130 may be used, and may be equally spaced apart (i.e., they may be clocked to be 120 degrees apart with respect to the annular periphery of the main ring member 110). For the termination ring 100 shown within FIGS. 1-4, four connector members (130*i*, 130*ii*, 130*iii*, and 130*iv*) are used, and are spaced 90 degrees apart. More than four connector members may be used, however, use of a far greater number of connector members may eventually become counterproductive, particularly depending upon the width used for the connector members, in that they may approach being a significant portion of a full cylinder, which may inhibit adequate flow of the plastic during the over-molding process, and may tend to obstruct the plastic from completely encapsulating the frame thereby formed ,and from completely surrounding the end of the hose body.

In one embodiment, four to six connector members 130, each having the relative proportions (e.g., width) shown in FIGS. 1-4, being equally spaced, may be used to provide suitable stability and adhesion for the main ring member 110. In another embodiment, seven to ten connector members may be used, again being equally spaced, but where each may have a narrower width. In one embodiment, the width of the connector members 130 may decrease in a proportion relative to the number of connector members used.

To further enhance the engagement between the over-molded plastic 150 and the framework to prevent decoupling, each of the connector members 130 may have a plurality of ridges 130R formed on its outer surface. Various different shapes may be used for the ridges. In one embodiment, the ridges 130R may preferably be formed to have a half-cylindrical shape, appearing as a semicircle in the side view of FIG. 2. The ridges may have a radiused transition to the outer surface of the connector members 130. The diameter of the cylinder used and the length of the connector member 130 may be such that three ridges 130R may be equally spaced on the connector member between the main ring member 110 and the secondary ring member 120.

Figure 5A:
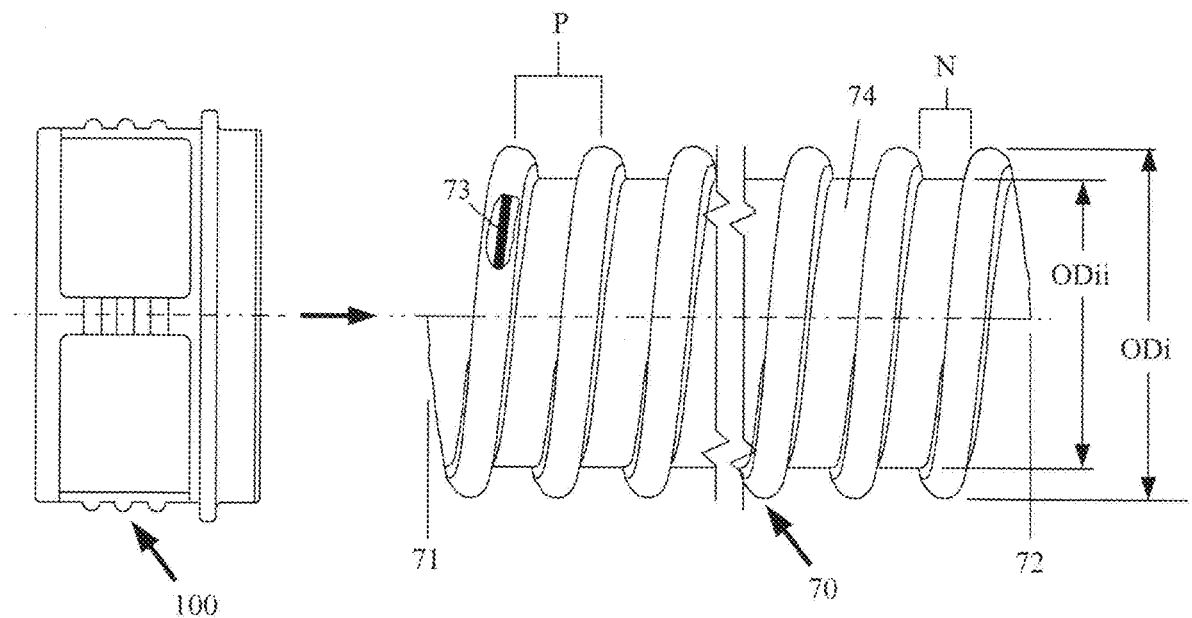
FIG. 5A shows the side view of the termination ring as seen in FIG. 2, just prior to being mechanically coupled to a flexible hose body.
Figure 5B:
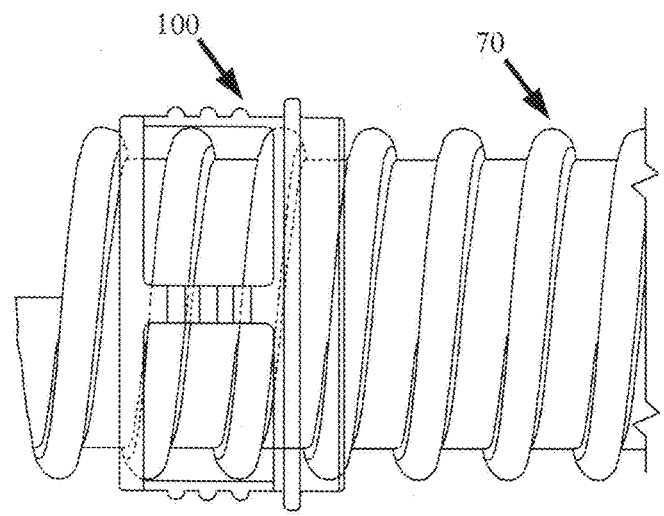
FIG. 5B shows the side view of the termination ring as seen in FIG. 5A, just after being mechanically coupled to the flexible hose body.

The termination ring 100 is shown in FIG. 5A just prior to being coupled/secured to the hose body 70, and is shown secured to the hose body in FIG. 5B.

In one embodiment, as seen in FIG. 5B, the main ring member 110 may be coupled to the series of turns of the hose body 70 to at least be positioned two away from the end of the hose body. As seen therein, the connector members 130 may be oriented to be nearly transverse to the helical reinforcement member 73, and may be parallel to the axis of the hose body 70. Also, in one embodiment, as seen in FIG. 5B, each of the plurality of connector members 130 may be formed to have a particular length that is configured to position the secondary ring member 120 to be at least two turns of the reinforcement member 70 away from the main ring member 110. Other distances (i.e., a length configured to position the secondary ring other numbers of turns away from the main ring member) may be used, which may depend upon certain factors, such as the physical requirements of the receptacle, the pitch P used by the hose body 70, the diameter of the hose body (e.g., ODi), etc. In one embodiment, as the diameter ODi increases and the pitch increases, the distance may be increased to extend for a greater number of turns (e.g., 3.25 turns, or 3.5 turns, etc.).

Figure 6:
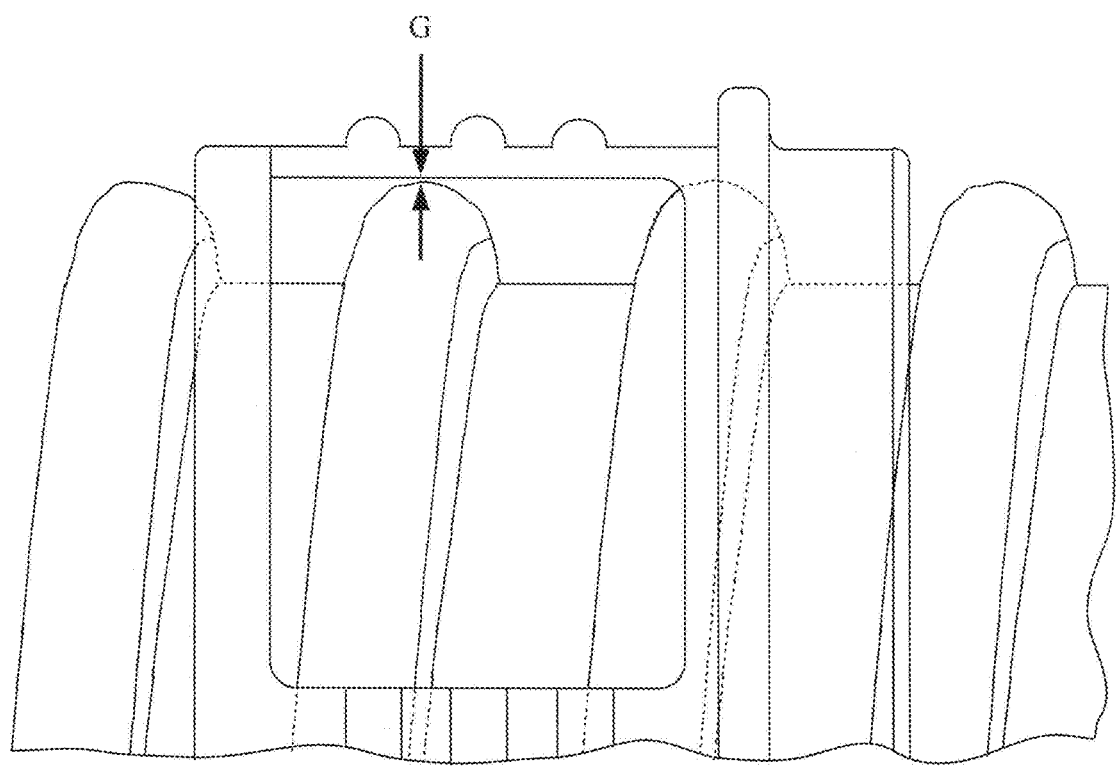
FIG. 6 is an enlarged detail view of a portion of the coupled termination ring and flexible hose body, as shown in FIG. 5B.

Furthermore, as seen in FIG. 5B and in the enlarged detail view of FIG. 6, each of the inner diameter D5 of the secondary ring member 120 and the corresponding inner surface of the connector members 130 (whether annular or planar), may be formed in particular relation to the layers of flexible material 74 that overlie the reinforcement member 73.

In one embodiment, the inner surface of the secondary ring member 120 (i.e., the surface formed by diameter D5), and the corresponding inner surface of the connector members 130, may be formed to just contact the outermost layer of flexible material 74 that overlies the reinforcement member 73 (i.e., D5=ODi). Alternatively, in another embodiment, the inner surface of the secondary ring member 120 and the corresponding inner surface of the connector members may be formed to engage the outermost layer of the flexible material 74 that overlies the reinforcement member 73 in a slight friction fit (i.e., D5<ODi). However, the latter embodiment, and even the first embodiment where there may be a build-up of manufacturing tolerances causing a friction fit (i.e., an interference fit), may cause some distortion to the end of the hose, which is some cases may be undesirable. In yet another embodiment, which may be preferable in certain eases, the inner surface of the secondary ring member 120 and the corresponding inner surface of the connector members may be formed with a clearance with respect to the outermost layer of the flexible material 74 that overlies the reinforcement member 73, to have a nominal gap G therebetween (i.e., D5>ODi), which gap may be one-half of the diametrical difference between D5 and ODi.

This configuration for the termination ring, and the arrangement with it being mechanically locked to at least a portion of one of the turns of the hose body using the internal threading or portion of a thread on its inner surface, provides for enhanced engagement with the over-molded plastic used for the cuff. It also provides a solid surface—being a portion of the main ring member of the termination ring—upon which the injection molded plastic for the cuff may be terminated, thereby eliminating quality and functional defects.

Figure 2B:
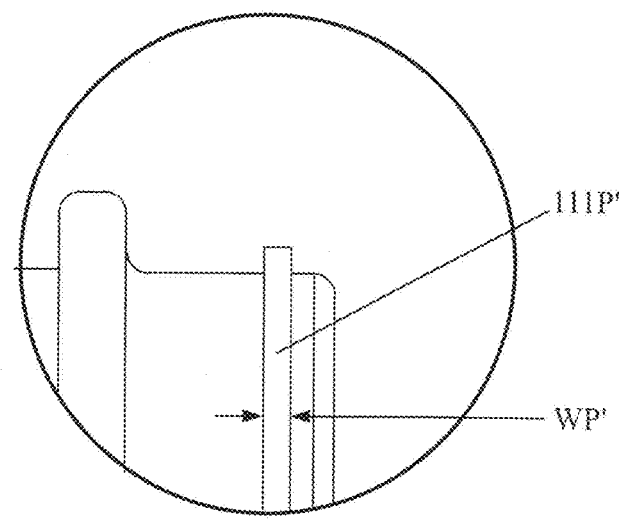
FIG. 2B is the side view of FIG. 2A but is enlarged to show the annular protrusion.
Figure 2A:
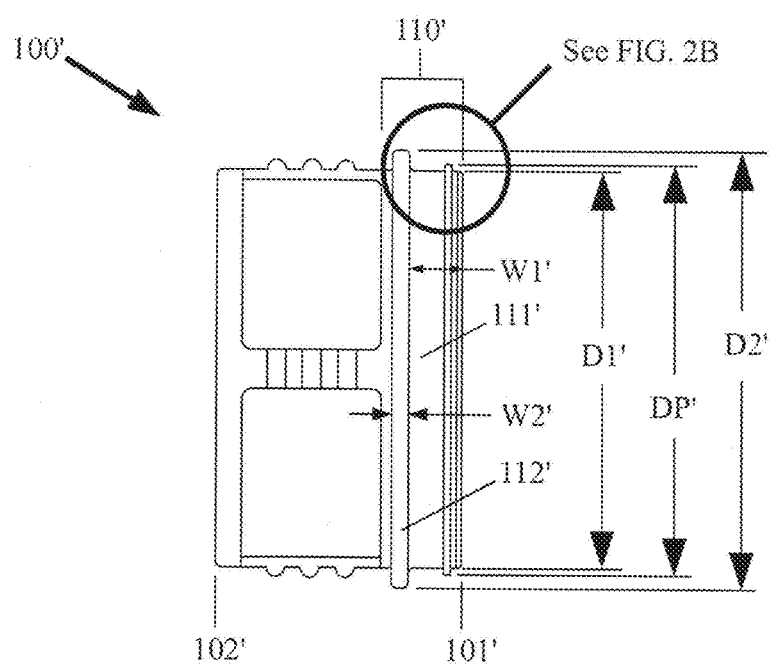
FIG. 2A is the side view of FIG. 2, but shows a variation of the termination ring that includes an annular protrusion on a portion. Of its main ring.

A variation of termination ring 100 is shown in FIGS. 2A and 2B in the form of termination ring 100' that may have a first end 101' and a second end 102'. The termination ring 100' may be formed the same as termination ring 100, except that the width W1' of the first portion 111' of the main ring member 110', which may be slightly larger than W1, may have an annular protrusion 111P' protruding therefrom having an outer diameter DP' that may be greater than diameter D1' but less than diameter D2', and which may be slightly less than half the difference therebetween (i.e., slightly less than (D2-D1')/2). The annular protrusion 111P' may have a width WP' that may be between one-fifth and one-half of the width W2' of the second portion 112'. The width W1' of the first portion 111' of the main ring member 110' may be larger than W1 of termination ring 100 by an amount that may be roughly equal to, or slightly larger than, the width WP' of the annular protrusion 111P'. The annular protrusion 111P' may serve to further improve termination of the injection molding of plastic upon the termination ring 100' when forming the over-molded cuff of the hose.

Figure 2D:
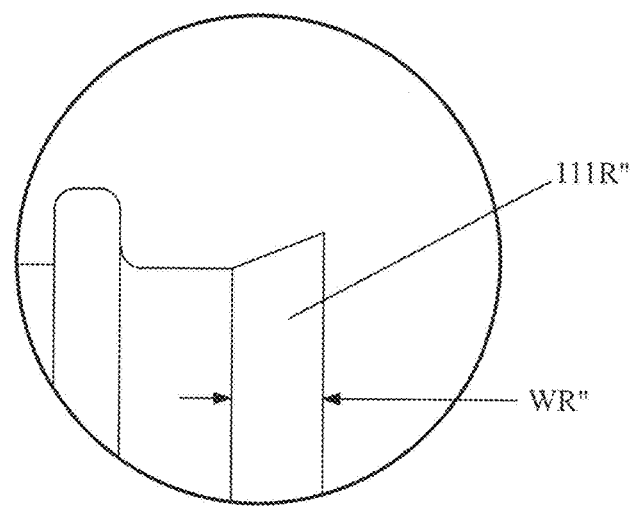
FIG. 2D is the side view of FIG. 2C but is enlarged to show the annular ramp.
Figure 2C:
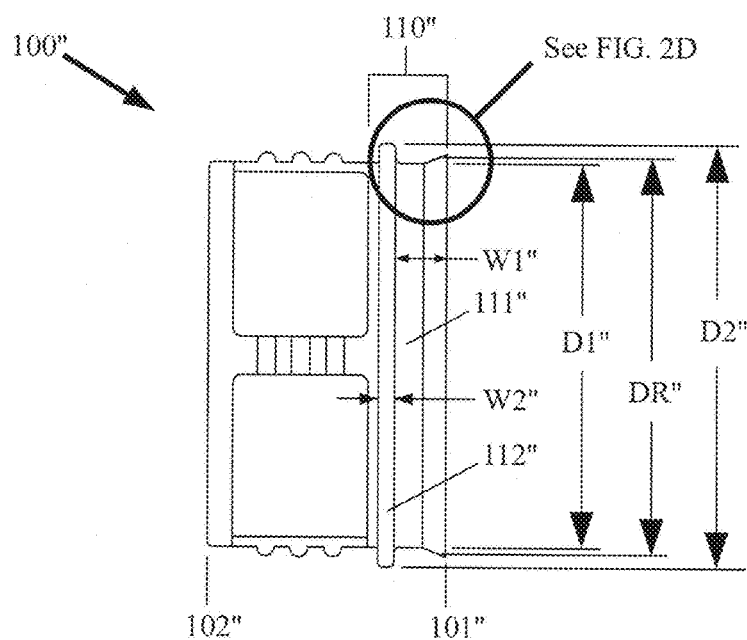
FIG. 2C is the side view of FIG. 2, but shows another variation of the termination ring that includes an annular ramp on a portion of its main ring.

A second variation of termination ring 100 is shown in FIGS. 2C and 2D in the form of termination ring 100" that may have a first end 101" and a second end 102". The termination ring 100" may be formed the same as termination ring 100, except that the width W1" of the first portion 111' of the main ring member 110', which may be. slightly larger than the width W1 of termination ring 100, as it may have an annular ramp 111R" having an outermost diameter DR' that may be greater than diameter D1' but less than diameter D2', and may be slightly less than half the difference therebetween (i.e., slightly less than (D2"-D1")/ 2). The annular ramp 111R" may have a width WR" that may be between one-fifth and one -half of the width W2" of the second portion 112". The width W1' of the first portion 111" of the main ring member 110" may be larger than W1 of termination ring 100. The annular ramp 111R" may serve to further improve termination of the injection molding of plastic upon the termination ring 100" when forming the over-molded cuff of the hose.

Figure 10:
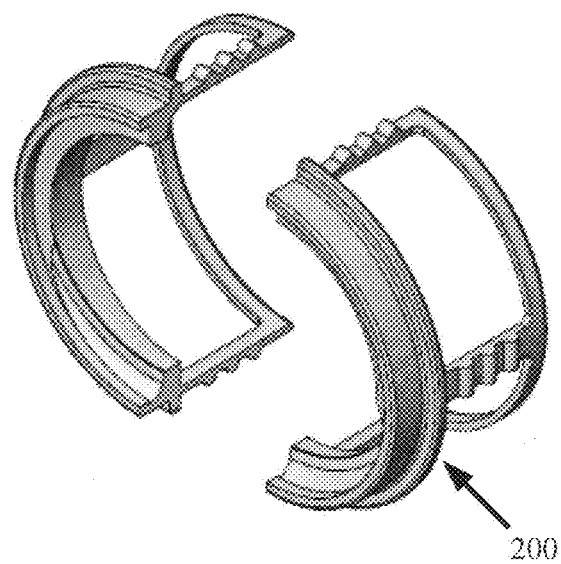
FIG. 10 illustrates a perspective view of an alternate embodiment of the termination ring of FIG. 1.
Figure 11:
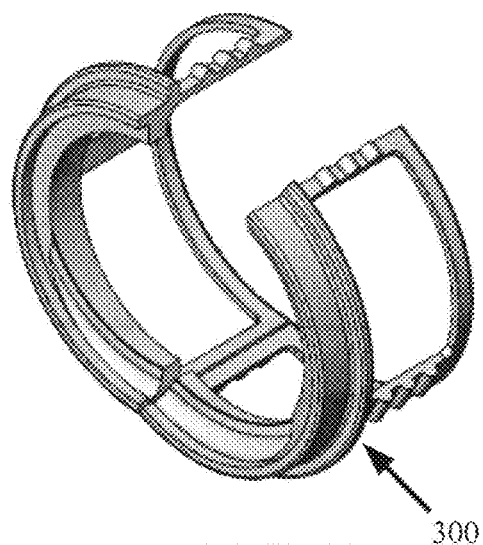
FIG. 11 illustrates a perspective view of another alternate embodiment of the termination ring of FIG. 1.

Alternate embodiments of the termination ring 100 are shown in FIGS. 10-11. The termination ring 200 shown in FIG. 10 may be substantially similar to termination ring 100, except that it may be formed in two separate halves that may be bonded together, after being placed over the hose body 70.

The termination ring 300 shown in FIG. 11 may be substantially similar to termination ring 200, except that the two halves that may joined at one end using a living hinge, and may also be bonded together, after being placed over the hose body 70 (see e.g., U.S. Pat. No. 6,117,169 to Moe for "Living Hinge Attachment of Leaflet to a Valve Body," U.S. Pat. No. 4,625,898 to Hazard, U.S. Pat. No. 5,127,537 to Graham, U.S. Pat. No. 5,271,536 to Wilson, and U.S. Pat. No. 8,179,684 to Smrha).

Yet another alternate embodiment of the termination ring 100 is shown in FIGS. 12-15, in the form of termination ring 400. Termination ring 400 may be formed with a main ring member 410 at the first end 401, being the same the main ring member 110 of termination ring 100. The secondary ring member 420 may be formed the same as the secondary ring member 120 of termination ring 100, except that it may extend to, and be integrally joined with, what is the third section 113 of the main ring member 110 of termination ring 100, to form a single cylindrical extension, as seen in FIGS. 14-15. The secondary ring member 420 may have a plurality of openings. In one embodiment, the plurality of openings may be regularly formed across the entire length of the secondary ring member 420 and across its entire circumference to provide for a substantial portion (e.g., 50% to 75%) of the cylinder being open to permit the flow of plastic therethrough during the injection molding process, and each opening may have an axis being normal to the cylindrical surface. In another embodiment, as seen in FIGS. 12-15, each of the plurality of openings 420P may have the same axis, which may be normal to the cylinder at only one point, which may be in the direction(s) that plastic may flow during the injection molding process. The plurality of openings 420P in this embodiment may similarly provide for a substantial portion (e.g., 50% to 75%) of the cylinder being open to permit the flow of plastic therethrough, but in the flow direction, which would be going into the page for the termination ring 400 shown in FIG. 15.

Figure 16:
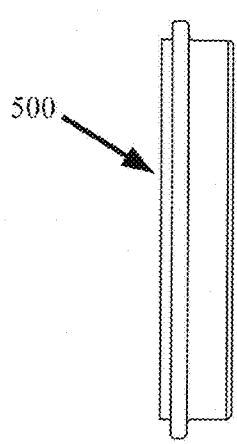
FIG. 16 illustrates a side view of yet another alternate embodiment of the termination ring of FIG. 1.
Figure 17:
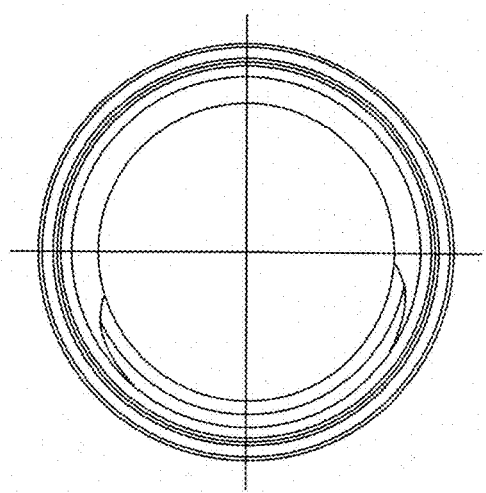
FIG. 17 is a front view of the termination ring of FIG. 16.

Yet another alternate embodiment of the termination ring 100 is shown in FIGS. 16-17, in the form of termination ring 500. Termination ring 500 may be formed to be the same as the main ring member 110 of the termination ring 100.

While illustrative implementations of one or more embodiments of the present invention are provided hereinabove, those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A flexible hose comprising:
  a reinforcement member formed into a series of flexible turns, having a first end and a second end, each said turn spaced from an adjacent one of said turns to create an interstitial area;
  one or more layers of a flexible material formed to overlay at least a portion of said series of turns of said reinforcement member and corresponding interstitial area, to create an opening at each of said first and second ends;
  at least one end fitting comprising:
    a termination ring comprising:
      a main ring, said main ring having an inside surface formed to threadably couple to a corresponding portion of said series of turns of said overlaid reinforcement member, being coupled to at least be positioned at least two of said turns away from said first end;
      a second ring;
      a plurality of connector members each configured to span between and be integrally formed with said main ring and said second ring, and be positioned proximate to said layers of flexible reinforcement material overlaying said reinforcement member; said plurality of connector members comprising a length configured to position said second ring at least two of said turns closer to said first end; and
      over-molded plastic, said over-molded plastic being molded to overlie said one or more layers of a flexible material at said first end of said reinforcement member, to encapsulate said second ring, to encapsulate each of said plurality of connector members, and to encapsulate a portion of said main ring; wherein said over-molded plastic is configured to extend beyond said first end to form a soft cuff.

2. The flexible hose according to claim 1,
  wherein said main ring comprises a first annular outer surface, a second annular outer surface, and a radially oriented shoulder surface, said radially oriented shoulder surface configured to form a radial step from said first annular surface to said second annular outer surface;
  wherein said over-molded plastic being molded to encapsulate said portion of said main ring comprises: being molded over said second annular surface and a portion of said first annular surface.

3. The flexible hose according to claim 2, wherein each of said connector members comprises a plurality of outwardly protruding ridges.

4. The flexible hose according to claim 3, wherein said series of flexible turns form a helix.

5. The flexible hose according to claim 4, wherein said plurality of connector members are equally distributed about an axis of said helical turns.

6. The flexible hose according to claim 5, wherein said helical reinforcement member is formed from a wire.

7. The flexible hose according to claim 1, wherein said inside surface formed to threadably couple to a corresponding portion of said series of turns of said overlaid reinforcement member comprises at least a portion of an internal thread formed on said inside surface.

8. The flexible hose according to claim 1, wherein said inside surface formed to threadably couple to a corresponding portion of said series of turns of said overlaid reinforcement member comprises one or more threads formed on said inside surface.

9. A termination ring, for use in forming an improved-quality over-molded plastic cuff on a flexible hose, said termination ring comprising:
  a main ring, said main ring having an inside surface formed with at least a portion of an internal thread being configured to threadably couple to a corresponding portion of a series of turns of a reinforcement member of the flexible hose, said main ring comprising a width configured to be coupled to at least one of the turns of the hose.;
  a second ring;
  a plurality of connector members each configured to span between said main ring and said second ring, and to extend from said second ring at a distal most. radial positon on said second ring; said plurality of connector members comprising a length configured to position said second ring at least two turns of the hose away from said main ring; each of said connector members comprising a plurality of outwardly protruding ridges.

10. A flexible hose comprising:
  a reinforcement member formed into a series of flexible turns, having a first end and a second end, each said turn spaced from an adjacent one of said turns to create an interstitial area;
  one or more layers of a flexible material formed to overlay at least a portion of said series of turns of said reinforcement member and corresponding interstitial area, to create an opening at each of said first and second ends;
  at least one end fitting comprising:
    a termination ring comprising:
      a main ring, said main ring having an inside surface formed to threadably couple to a corresponding portion of said series of turns of said overlaid reinforcement member, being coupled to at least be positioned at least two of said turns away from said first end;

a second ring configured to extend away from and be integrally formed with said main ring, and to have an interior surface be positioned proximate to said layers of flexible reinforcement material overlaying said reinforcement member; said second ring comprising a length configured to position a distal end of said second ring at least two of said turns closer to said first end; said second ring comprising a plurality of openings over a substantial portion of its surface area; and over-molded plastic, said over-molded plastic being molded to overlie said one or more layers of a flexible material at said first end of said reinforcement member, to encapsulate said second ring, to encapsulate each of said plurality of connector members, and to encapsulate a portion of said main ring; wherein said over-molded plastic is configured to extend beyond said first end to form a soft cuff.

* * * * *